(12) United States Patent
Kazdaghli et al.

(10) Patent No.: US 10,216,973 B2
(45) Date of Patent: Feb. 26, 2019

(54) METHOD FOR IMPROVING IMAGES APPLICABLE TO FINGERPRINT IMAGES

(71) Applicant: Safran Identity & Security, Issy-les-Moulineaux (FR)

(72) Inventors: Laurent Kazdaghli, Issy les Moulineaux (FR); Cedric Thuillier, Issy les Moulineaux (FR); Lauriane Couturier, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 39 days.

(21) Appl. No.: 15/451,246

(22) Filed: Mar. 6, 2017

(65) Prior Publication Data
US 2017/0255807 A1  Sep. 7, 2017

(30) Foreign Application Priority Data

Mar. 4, 2016  (FR) ...................................... 16 51822

(51) Int. Cl.
*G06K 9/00* (2006.01)
*G06T 5/00* (2006.01)
*G06T 7/11* (2017.01)
*G06T 7/155* (2017.01)
*G06K 9/52* (2006.01)

(52) U.S. Cl.
CPC ....... *G06K 9/0002* (2013.01); *G06K 9/00087* (2013.01); *G06K 9/522* (2013.01); *G06T 5/007* (2013.01); *G06T 7/11* (2017.01); *G06T 7/155* (2017.01)

(58) Field of Classification Search
None
See application file for complete search history.

(56) References Cited

U.S. PATENT DOCUMENTS

2014/0133714 A1\* 5/2014 Ivanov ............... G06K 9/00013
382/124
2017/0147865 A1\* 5/2017 Jensen ............... G06K 9/00053

OTHER PUBLICATIONS

Automatic Latent Fingerprint Segmentation Based on Orientation and Frequency Features. Revathy et al., Apr. 2014.\*

(Continued)

*Primary Examiner* — Delomia L Gilliard
(74) *Attorney, Agent, or Firm* — Womble Bond Dickinson (US) LLP

(57) ABSTRACT

The invention relates to a method for processing an image comprising a set of pixels, each pixel being associated with a grey level, the method comprising a step of segmentation of the image to generate a modified image only containing regions of the image having an alternation of bright zones and dark zones at a frequency greater than a minimum frequency, said step of segmentation comprising:
  the allocation, to each pixel of the image, of a frequency response level, corresponding to a frequency of alternations of bright zones and dark zones in the vicinity of the pixel,
  the definition of regions of the image by grouping together neighboring pixels of same frequency response level,
  the determination of a threshold frequency response level, and
  the generation of an image only comprising regions of which the pixels have a frequency response level greater than or equal to the threshold frequency response level.

11 Claims, 3 Drawing Sheets

(56) References Cited

OTHER PUBLICATIONS

A graph-based segmentation algorithm for tree crown extraction using airborne LiDAR data. Strimbu et al., Jun. 2015.*
A Robust Technique for Latent Fingerprint Image Segmentation and Enhancement. Karimi-Ashtiani. 2008.*
Revathy et al. "Automatic Latent Fingerprint Segmentation Based on Orientation and Frequency Features." 2014 Int. Conference on Communication and Signal Processing, IEEE (Apr. 3, 2014). pp. 1192-1196.
Shahryar et al. "A Robust Technique for Latent Fingerprint Segmentation and Enhancement." 15th IEEE Int. Conference on Image Processing (2008). pp. 1492-1495.
Strimbu et al. "A Graph-Based Segmentation Algorithm for Tree Crown Extraction using Airborn LiDAR Data." ISPRS Journal of Photogrammetry and Remote Sensing, vol. 104 (Jun. 1, 2015). Pp. 30-34.
Search Report in French Application No. 1651822 dated Oct. 24, 2016, with English translation coversheet.

\* cited by examiner

METHOD FOR IMPROVING IMAGES APPLICABLE TO FINGERPRINT IMAGES

FIELD OF THE INVENTION

The invention relates to a method for processing a finger image acquired by a fingerprint sensor of direct view type and comprising at least one fingerprint in order to implement an authentication or identification of an individual by comparison of fingerprints. The invention applies in particular to the processing of fingerprint images acquired by sensors of thin film transistor type.

PRIOR ART

Novel types of sensors are currently being developed for the acquisition of fingerprint images, based notably on the direct view of the finger. This is the case for example of sensors based on TFT (Thin Film Transistor) technology.

These sensors may be less bulky and quicker to use than sensors conventionally used until now, which are sensors based on the principle of frustrated total reflection of light on an interface on which a user lays down his/her finger.

Indeed, these sensors may for example take a series of images of the hand of an individual approaching a contact surface of the sensor, and exploit images of the fingers even in the absence of contact with the contact surface, or in the absence of significant pressure exerted by the fingers on the contact surface.

On the other hand, direct view based sensors produce a fingerprint image in which the contrast is in general much lower than images obtained by sensors based on the principle of frustrated total reflection. In addition, parasitic zones may exist on the images, such as for example cast shadows in the case where an image has been acquired in the absence of contact of the fingers on the contact surface of the sensor.

Hence, the fingerprint images obtained by direct view based sensors are not at this stage directly exploitable by the algorithms implemented in systems for automatic identification or authentication from fingerprints.

In order to make these images compatible, that is to say to ensure that a fingerprint acquired with a sensor with direct lighting can be recognised using the same algorithms as prints acquired with conventional technologies based on frustrated total reflection, it is necessary to propose appropriate processing.

This processing has to take into account the great variability of the images obtained with direct view based sensors. For example, shadows cast on the images may have very variable sizes and positions depending on the number and the position of the light sources illuminating the finger, and the position of the hand during the acquisition.

In addition, since it is a processing making it possible to implement an authentication or identification of an individual by comparison of fingerprints on a finger image acquired by a fingerprint sensor of direct view type, it is necessary that the processing method is very rapid. Indeed, a fingerprint sensor of direct view type generally acquires more than 10 images per second, for example 15 or 20 images per second, which moreover is of large size/resolution (for example 1600×1600 pixels) and the processing of these images must be immediate.

Certain processing methods are suited for processing images of latent fingerprints, that is to say images of the residual trace resulting from the apposition of a finger on a support. It is notably these latent fingerprints that are revealed in crime scenes and analysed by forensic teams. The processing of latent fingerprints does not have a rapidity constraint. Thus, the document "*Automatic Latent Fingerprint Segmentation based on Orientation and Frequency Features*", by Revathy et al., International Conference on Communication and Signal Processing, 3-5 Apr. 2014, pages 1192-1196, describes a method for processing latent fingerprints implementing an automatic segmentation of images, based on the characteristics of orientation and frequency, comprising notably the implementation of a discrete Fourier transform. The proposed processing is very heavy, and very long. It may take more than a half-second for an image NIST SD 27 of size 800×800. Such a duration is not possible for processing a finger image acquired by a fingerprint sensor of direct view type, which takes more than 10 images per second.

In addition, the processings proposed for latent fingerprints aim to extract all the ridge information of the image. Yet, an image acquired by a fingerprint sensor of direct view type frequently has, at the surface of the sensor, traces outside of the finger resulting from preceding finger contacts (which are thus latent fingerprints). The processing implemented must be able to distinguish between these traces and the fingerprints of the finger presented to the sensor.

DESCRIPTION OF THE INVENTION

The aim of the invention is to overcome the aforementioned problems, by proposing an image processing method that makes it possible to adapt a fingerprint image acquired with a direct view sensor, for example of TFT type, such that the image can be exploited in an automatic fingerprint identification or authentication system.

Another aim of the invention is to propose a processing that is sufficiently rapid to be able to be implemented in real time during the acquisition of images by a sensor.

Another aim of the invention is to propose a processing that makes it possible to generate a fingerprint image exploitable by an identification or authentication system that is generated from a single initial image, and not synthesised from several takes, in order to rule out risks of errors linked to a movement between two takes.

In this respect, the subject matter of the invention is a method for processing a finger image acquired by a fingerprint sensor of direct view type and comprising at least one fingerprint in order to implement an authentication or identification of an individual by comparison of fingerprints, said image comprising a set of pixels, each pixel being associated with a grey level, the method comprising a step of segmentation of the image to generate a modified image only containing regions of the image having an alternation of bright zones and dark zones at a frequency greater than a minimum frequency, said step of segmentation comprising:

the allocation, to each pixel of the image, of a frequency response level, corresponding to a frequency of alternations of bright zones and dark zones in the vicinity of the pixel, by evaluating the variabilities of the grey levels of the pixels contained in a window of determined size positioned around each pixel, the definition of regions of the image by grouping together neighbouring pixels of same frequency response level, the determination of a threshold frequency response level, selection, among the regions of the image defined previously by grouping together neighbouring pixels of same frequency response level, of regions of which the pixels have a frequency response level greater than or equal to the threshold frequency response level, and the generation of a modified image only comprising, among the regions of the image defined previously by grouping together neighbouring pixels of same frequency response level, regions of which the pixels have a frequency response level greater than or equal to the threshold frequency response level.

Advantageously, but optionally, the method according to the invention may further comprise at least one of the following characteristics:

the allocation, to a pixel, of a frequency response level by evaluating the variabilities of the grey levels of the pixels contained in a window of determined size positioned around each pixel comprising the determination of a gradient of grey levels, the frequency response level allocated to said pixel being based on said gradient of grey levels;

the regions of the image defined by grouping together neighbouring pixels of same frequency response level are advantageously structured, to determine the threshold frequency response level, into a topological tree or a connected component tree, defining a parent relationship between said regions of the image;

the regions of the image are advantageously structured according to a parent-daughter relationship defined as follows, for each region i of the image:
  initially all the neighbouring regions of the region i on the image are considered as potential parents,
  if the number of potential parents is equal to 1, the neighbour j is assigned as parent to the region i, and the region i is removed from the list of potential parents of the region j,
  if not, each parent region of the region i is selected, from the list of potential parents having a lower frequency response level than that of the region i, as that having the level the closest to that of the region i, and the region i is removed from the list of potential parents of its parent region, and
  if all the potential parents of the region i have a frequency response level higher than that of the region i, each parent region of the region i is selected as that having the frequency response level the closest to that of the region i, and the region i is removed from the list of potential parents of its parent region;

the determination of the threshold frequency response level may comprise the implementation of the following steps:
  for a set frequency response level N, definition of a set of macro-regions designated level N, such that each macro-region of level N comprises a parent region of pixels of frequency response level less than or equal to N and the set of daughter regions of this region,
  for each value of frequency response level from an initial value of frequency response level in the image, calculation of the relative variation in surface of the macro-regions of a level $N_n$ compared to the macro-regions of the preceding level $N_{n-1}$, and
  the minimum frequency response level is determined as the level $N_i$ for which the relative variation in surface of the macro-regions of level $N_i$ compared to the preceding level $N_{i-1}$ is minimal;

the step of segmentation comprises, before the definition of the regions of the image by grouping together neighbouring pixels of same frequency response level, the implementation of the steps of:
  morphological erosion then dilation of the image as a function of the values of grey level of the pixels,
  generation of a differential image by subtraction, from the initial image, of the image having undergone morphological erosion and dilation,
  application, to the differential image, of a median filter on the value of the frequency response level, and in which the definition of the regions of the image by grouping together neighbouring pixels of same frequency response level is implemented on the image resulting from the application of the median filter on the differential image;

the method may further comprise, after the step of segmentation, a step of enhancement of the grey levels associated with the pixels of the modified image, the degree of enhancement of the pixels of a region being a function of the frequency response level of the pixels of the region;

advantageously, the higher the frequency response level of the pixels of a region of the modified image, the greater the degree of enhancement of grey levels associated with the pixels of the region.

The subject matter of the invention is also a computer programme product, comprising code instructions for the implementation of the method according to the preceding description, when it is executed by a processor. Preferably, the computer programme product is a computer readable support comprising a memory storing code instructions for the implementation of the method according to the preceding description, when it is executed by a computer.

The subject matter of the invention is also an image processing system, comprising a processing unit comprising processing means configured to implement the method according to the preceding description, said processing means comprising at least one processor and a memory.

Advantageously, but optionally, the image processing system further comprises an image acquisition means, said image acquisition means being a fingerprint sensor of thin film transistor type.

The proposed method comprises a particular step of segmentation, which makes it possible to only conserve, of the initial image, zones of the image having a high frequency of variations between bright zones and dark zones, which corresponds, for a fingerprint image, to the exploitable part for the identification or the authentication corresponding to the ridges and valleys of the fingerprint.

In particular, uniformly bright zones (zones of the image where there is no finger) and uniformly dark zones (cast shadows) are eliminated from the image.

The formation of zones is carried out by the implementation of an algorithm of "rising water" type, which makes it possible to conserve related regions of images and to avoid the presence of holes in the zones corresponding to fingerprints.

The method may include an enhancement of the grey levels of the pixels as a function of the frequency of variations between bright zones and dark zones: in other words, the more the zone of the image corresponds to an exploitable zone of ridges and valleys, the more the contrast of this zone is increased.

Moreover, the proposed method may be implemented in real time during the acquisition of the image because the process of segmentation only requires scanning the image a single time to define a set of regions, then processing the regions by blocks, this step requiring only treating a number of regions much lower than the number of pixels of the image.

DESCRIPTION OF THE FIGURES

Other characteristics, aims and advantages of the present invention will become clearer on reading the detailed description that follows, with regard to the appended figures, given as non-limiting examples, and in which.

DETAILED DESCRIPTION OF AT LEAST ONE EMBODIMENT OF THE INVENTION

Figure 1:
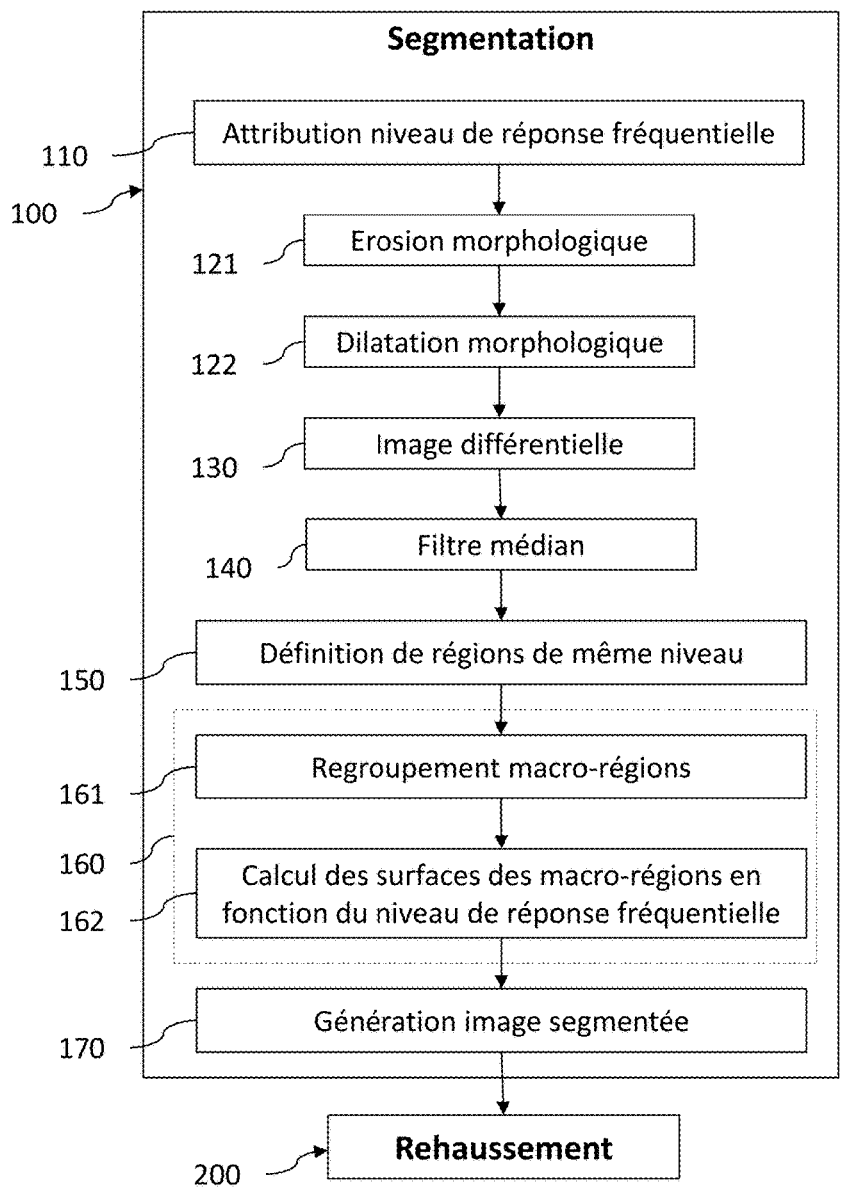
FIG. 1 represents the main steps of an image processing method.

With reference to FIG. 1, the main steps of an image processing method are represented. The processed image comprises a set of pixels, each pixel being associated with a grey level, conventionally comprised between 0 and 255.

The processed image is advantageously an image of one or more fingers, on the palm side of the hand, and representing the end of the finger(s) on which are found the fingerprints, or the palm itself of the hand. More advantageously, the processed image is an image acquired from a fingerprint sensor of direct view type, such as a sensor based on thin film transistor (TFT) technology. Reference could be made for example to the documents US 20020054394 or US 20020000915. Such an image thus generally has mainly white pixels, that is to say with a grey level at 255, and with dark zones corresponding to shadows and to prints having pixels with grey levels close to 0.

Figure 2:
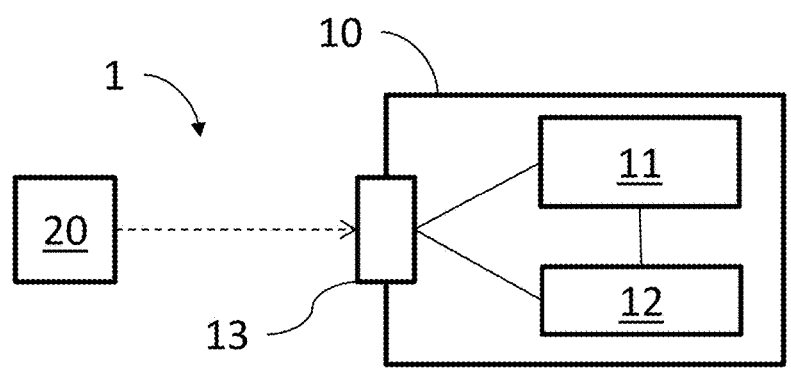
FIG. 2 schematically represents an image processing system.

As schematically represented in FIG. 2, the image processing method is implemented by an image processing system 1 including a processing unit 10 such as for example a computer. The processing unit 10 comprises processing means 11 such as for example a processor. The image processing may be implemented by an appropriate computer algorithm. The processing means 11 are then suited to executing code instructions making it possible to implement the image processing algorithm.

The image processing system 1 also advantageously comprises an image sensor 20, suited to communicating with the processing unit 10 to transmit, to it, the images acquired. Advantageously, the image sensor is a direct view fingerprint sensor, for example of thin film transistor type.

The image sensor 20 may be remote from the processing unit, and connected thereto by a wireless connection, for example of WiFi type, etc.

The processing unit 10 includes a memory 12 and a communication interface 13 with the image sensor 20. In an alternative embodiment, the image processing system may also comprise an image database (not represented), from which the processing unit may recover images to process, these images having been obtained by an image sensor.

Figure 3A:
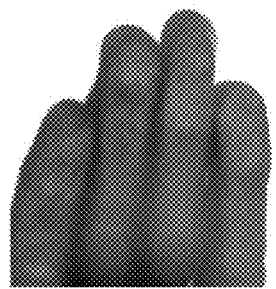
FIGS. 3a to 3c schematically represent the implementation of the different steps of the method on an example of image.

FIG. 3a shows an example of image acquired from a direct view fingerprint sensor. As may be noted, this image is not exploitable, as is, to carry out an identification or authentication processing on the fingerprints, for example by extraction and comparison of the minutiae. Indeed, it includes shadows (around fingers) and finger zones extending beyond the fingerprints and lacking interest for an identification or authentication processing.

Returning to FIG. 1, the image processing method comprises a first step 100 of segmentation of the image. This step of segmentation is designed so as to only conserve, of the initial image, zones having a high frequency of alternation between bright zones and dark zones. This makes it possible, in the case where the processed image is an image of the tip of the fingers bearing the fingerprints, to only conserve the zone useful for the fingerprints themselves.

To do so, the step 100 of segmentation comprises a first step 110 of allocation, to each pixel, of a frequency response level, which corresponds to a frequency of alternations between bright zones and dark zones in the vicinity of the pixel.

The level may be determined by positioning around each pixel a window of determined size, and by evaluating the variabilities of the grey levels of the pixels contained in the window. The window may for example be a square with sides of the order of 10 to 20 pixels. The evaluation of the variabilities of the grey levels of the pixels contained in the window may comprise, to allocate a frequency response level to a pixel, the determination of a gradient of grey levels, the frequency response level allocated to said pixel being based on said gradient of grey levels.

The gradient of grey levels corresponds to the difference between the grey level of the pixel and the grey levels of the pixels in the window. More precisely, by noting (z) the pixels contained in the window surrounding the pixel (i), the gradient of grey levels of the pixel (i) is calculated by the difference between the grey level of the pixel (i) and the maximum grey level among the minimum grey levels of the pixels (y) contained in a window surrounding each pixel (z) of the window surrounding the pixel (i). Preferably, the gradient is calculated in absolute value.

In other words, by designating Y(i) the set of pixels (z) contained in the window surrounding the pixel (i), Y(z) the set of pixels (y) contained in the window surrounding each pixel (z), and pixel level the grey level of a pixel, the frequency response level "response (i)" of the pixel (i) may be calculated as follows:

$$\text{response}(i) = \text{abs}[\text{level pixel}(i) - \max_{z \in Y(i)}(\min_{y \in Y(z)} \text{level pixel}(y))]$$

Where "abs" designates the absolute value function. It should be noted that the windows are here taken of same dimension in the maximum and minimum function, but they could be of different dimensions.

From this step, the values processed in each pixel are thus no longer grey levels but frequency response levels. The terminology "pixel" is conserved.

Then the step 100 of segmentation advantageously comprises a step of morphological opening of the image, which comprises a step 121 of morphological erosion followed by a step 122 of morphological dilation of the image.

Morphological erosion is a processing which consists in assigning to a pixel the value of the lowest frequency response level of a window of pixels incorporating it. For example the window of pixels may be a square window, for example with sides of the order of 10 pixels, or less, such as sides of 3 pixels.

Morphological dilation is a processing which consists in assigning to a pixel the value of the highest frequency response level of a window of pixels incorporating it. Here again the window of pixels may for example be a square window, for example with sides of the order of 10 pixels, or less, such as sides of 3 pixels.

These two steps make it possible to average out the image of which the high frequencies of alternations between bright zones and dark zones are eliminated.

Figure 3B:
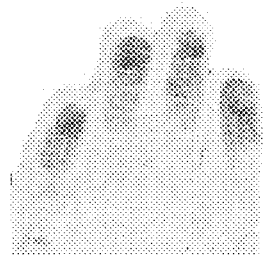

The step of morphological closing is followed by a step 130 of generation of a differential image, which is obtained by subtracting from the initial image the averaged image resulting from the processing of steps 121 and 122. Thus, the differential image now only includes the zones of interest in the image, that is to say the zones having a high frequency of alternation between bright zones and dark zones, as may be seen in FIG. 3b.

Then, the step 100 of segmentation comprises a step 140 of application of a median filter to the differential image obtained at the end of the step 130, the median filter being implemented as a function of the values of frequency response level of the pixels.

The segmentation 100 then comprises a step 150 of definition, in the image, of regions grouping together neighbouring pixels of same frequency response level. These regions are advantageously structured into a topological tree, or a connected components tree. The tree defines a parent-daughter relationship between the regions of the image determined by taking into account both the spatial organisation of the regions defined by grouping together neighbouring pixels of same frequency response level and the frequency response levels of pixels contained in these regions. More precisely, it is thus a morphological tree of shapes.

To do so, the regions are defined and structured as follows.

A region is firstly defined by the set of neighbouring pixels of same frequency response level. For each region, a list of neighbouring regions is defined, that is to say regions having pixels in contact with the pixels of the region considered.

Then a parent relationship between regions or, put another way, a daughter region-parent region relationship, is defined as follows:

For a region i designated daughter region, initially all the neighbouring regions of the region i are considered as potential parents.

If the number of potential parents is equal to 1, that is to say that the region i only has a single neighbour j, the neighbour j is assigned as parent to the region i, and the region i is removed from the list of potential parents of the region j.

if not, one selects from the list of potential parents having a frequency response level lower than that of the region i that or those having the level the closest to that of the region i. There may thus be several parents for a same region i, which are then not neighbouring. When the region j is assigned as parent to the region i, the region i is removed from the list of potential parents of the region j.

If all the potential parents have a frequency response level higher than that of the region i, one determines as parent for the region i the region(s) having the frequency response level the closest to that of the region i (the level then being greater than that of the region i). When the region j is assigned as parent to the region i, the region i is removed from the list of potential parents of the region j.

The segmentation is then going to comprise a selection of the regions defined above, which have a frequency response level greater than a determined threshold level.

However, if by seeking to only conserve the zones of interest corresponding to fingerprints, the threshold is set at a too high value, there exists a risk of only recovering from the initial image divided up regions, potentially including holes which, although corresponding to zones of lowest frequency responses, may be relevant for the exploitation of prints.

To avoid this phenomenon, the step 100 of segmentation comprises a step 160 of determination of the frequency response level threshold comprising a first sub-step 161 of definition of macro-regions from the regions and parent-daughter relationships defined above between the regions.

Macro-regions are defined for a set value of level of response N. For this set value N, a macro-region includes a region of frequency response level lower than or equal to N and all the daughter regions of this region.

The definition of such a macro-region is carried out by determining, for each region of the image, the parent region having the highest frequency response level which is less than the level N. Then, from this parent, the macro-region is defined as grouping together all the daughter regions of this parent.

Given the construction of the parent-daughter relationship defined above, the daughter regions do not necessarily have a higher frequency response level than the parent region. In certain cases, there exists, for a parent region, daughter regions that are isolated but having a lower level (for example the case in which the daughter region only has one potential parent). As a result of this construction, the fact of integrating all the daughter regions in the macro-region makes it possible to avoid the appearance, in the macro-regions, of empty zones corresponding to zones of the image globally darker or brighter and without alternations of bright and dark zones.

Each macro-region thus comprises a region of pixels of frequency response level less than or equal to N, and a set of neighbouring regions defined as daughter regions by the definition given above.

Figure 3C:
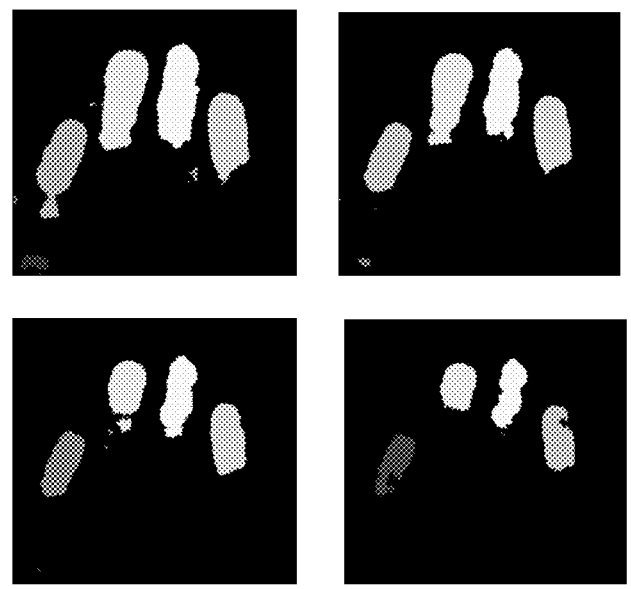

The definition of a macro-region thus varies as a function of the frequency response level N. Consequently, the surface of the image occupied by the macro-region also varies. This appears in FIG. 3c, which represents macro-regions defined for several frequency response levels.

In particular, the higher the level N and the higher the number of daughter regions in a macro-region, thus the greater the surface of the macro-region.

The image segmented at the end of the step 100 includes the macro-regions thus defined, for a particular value of frequency response level N. To determine this value, the step 160 comprises an incremental process 162 comprising incrementing the value of the frequency response level from an initial level, and advantageously up to the highest value of level in the image. For each increment of the value of the frequency response level, the surface of the image covered by the set of macro-regions of the corresponding level is measured, and the relative variation in the surface occupied by said macro-regions compared to the preceding level is calculated.

By noting $\mathrm{Surf}(N_n)$ the surface occupied by the macro-regions of frequency response level $N_n$, one calculates: $R=(\mathrm{Surf}(N_n)-\mathrm{Surf}(N_{n-1}))/\mathrm{Surf}(N_{n-1})$.

The threshold frequency response level $N_S$ determined for the segmentation of the image as being the level for which the relative variation in the surface occupied by the macro-regions between one level and the preceding level is minimal, that is to say when R is the lowest, which corresponds to the level for which the surface of the macro-regions is the most stable.

Once the threshold level has been determined, the step 100 of segmentation comprises a step 170 of generation of the segmented image, in which are conserved, of the image resulting from step 140, only the macro-regions of level $N_S$. In addition, the overlap zones of the macro-regions are eliminated: when two macro-regions have pixels in common, the definition of the parent-daughter relationship implies that a macro-region is necessarily incorporated in the other. Then the overlap zones of macro-regions are eliminated by eliminating the macro-regions incorporated in larger macro-regions.

Then the image processing method comprises a second step 200 of enhancement of the image obtained at the end of step 100. Enhancement is an operation consisting in modifying the values of grey levels of the pixels of the image to improve the contrast. For example, if in an image the pixels have grey levels comprised between 100 and 200, the enhancement consists in allocating to pixels having a grey level at 200 a new level at 255, to those having a grey level at 100 a new level at 0, and distributing the values of the other pixels between 0 and 255 according to a particular law.

To be specific, in step 200, the law of re-assignment of the value of the grey level of a pixel is chosen so as to be a function of the value of the frequency response level of this pixel. In other words, the higher the frequency response level of a pixel, the higher the enhancement, that is to say the greater the contrast for the pixels considered.

An example of law of re-assignment of the value of the grey level of the pixel is the following law:

$$g(x) = (1-a) * \min + (x - \min) * \frac{(Gmax - Gmin)}{(\max - \min)}$$

With:

$$(Gmax - Gmin) = (1-a)*(\max - \min) + a*255$$

Where "a" is the frequency response level of the pixel x, normalised to be brought between 0 and 1. With a low value of "a", corresponding to a low frequency response level, the value of the grey level of the pixel will be almost not modified, and with a high value, the value of the grey level of the pixel will be more modified.

This makes it possible to improve contrast in the zones of the image corresponding to fingerprints, and which are thus the richest in information for a future exploitation by an identification or authentication system.

The image obtained at the end of the processing method is thus exploitable to implement an authentication or identification of an individual by comparison of fingerprints. Preferably, the method is a biometric method comprising a step of authentication or identification of an individual by comparison of fingerprints on the basis of the modified image.

The invention claimed is:

1. Method for processing a finger image acquired by a fingerprint sensor of direct view type and comprising at least one fingerprint in order to implement an authentication or identification of an individual by comparison of fingerprints, said finger image comprising a set of pixels, each pixel being associated with a grey level, the method comprising a step of segmentation of the finger image to generate a modified image only containing regions of the finger image having an alternation of bright zones and dark zones at a frequency greater than a minimum frequency, said step of segmentation comprising:
   a. the allocation, to each pixel of the finger image, of a frequency response level, corresponding to a frequency of alternations of bright zones and dark zones in the vicinity of the pixel, by evaluating the variabilities of the grey levels of the pixels contained in a window of determined size positioned around each pixel,
   b. the definition of regions of the finger image by grouping together neighbouring pixels of same frequency response level previously allocated to each pixel,
   c. the determination of a threshold frequency response level,
   d. selection, from the regions of the finger image defined previously by grouping together neighbouring pixels of same frequency response level, of regions of which the pixels have a frequency response level greater than or equal to the threshold frequency response level, and
   e. the generation of the modified image only comprising, among the regions of the finger image defined previously by grouping together neighbouring pixels of same frequency response level, regions of which the pixels have a frequency response level greater than or equal to the threshold frequency response level,
   f. a step of authentication or identification of an individual by comparison of fingerprints on the basis of the modified image.

2. Method according to claim 1, in which the allocation, to a pixel, of a frequency response level by evaluating the variabilities of the grey levels of the pixels contained in a window of determined size positioned around each pixel comprises the determination of a gradient of grey levels, the frequency response level allocated to said pixel being based on said gradient of grey levels.

3. Method according to claim 1, in which the regions of the finger image defined by grouping together neighbouring pixels of same frequency response level are structured, to determine the threshold frequency response level, into a topological tree or a connected component tree, defining a parent relationship between said regions of the finger image.

4. Method according to claim 1, in which the regions of the finger image are structured according to a parent-daughter relationship defined as follows, for each region i of the finger image:
   initially all the neighbouring regions of the region i on the finger image are considered as potential parents,
   if the number of potential parents is equal to 1, the neighbour j is assigned as parent to the region i, and the region i is removed from the list of potential parents of the region j,
   if not, each parent region of the region i is selected from the list of potential parents having a frequency response level lower than that of the region i, as that having the level the closest to that of the region i, and the region i is removed from the list of potential parents of its parent region, and
   if all the potential parents of the region i have a frequency response level greater than that of the region i, each parent region of the region i is determined as that having the frequency response level the closest to that of the region i and the region i is removed from the list of potential parents of its parent region.

5. Method according to claim 3, in which the determination of the threshold frequency response level comprises the implementation of the following steps:
   for a set frequency response level N, definition of a set of macro-regions designated level N, such that each macro-region of level N comprises a parent region of pixels of frequency response level lower than or equal to N and the set of daughter regions of this region,
   for each value of frequency response level from an initial value of frequency response level in the finger image, calculation of the relative variation in surface of the macro-regions of a level $N_n$ compared to the macro-regions of the preceding level $N_{n-1}$, and the minimum frequency response level is determined as the level $N_i$ for which the relative variation in surface of the macro-regions of level $N_i$ compared to the preceding level $N_{i-1}$ is minimal.

6. Method according to claim 1, in which the step of segmentation comprises, before the definition of the regions of the finger image by grouping together neighbouring pixels of same frequency response level, the implementation of the steps of:

morphological erosion then dilation of the finger image as a function of the values of grey level of the pixels, generation of a differential image by subtraction, from the initial finger image, of the finger image having undergone morphological erosion and dilation, application, to the differential image, of a median filter on the value of the frequency response level, and in which the definition of the regions of the finger image by grouping together neighbouring pixels of same frequency response level is implemented on a resulting image that results from the application of the median filter on the differential image.

7. Method according to claim 1, further comprising, after the step of segmentation, a step of enhancement of the grey levels associated with the pixels of the modified image, the degree of enhancement of the pixels of a region being a function of the frequency response level of the pixels of the region.

8. Method according to claim 7, in which the higher the frequency response level of the pixels of a region of the modified image, the higher the degree of enhancement of grey levels associated with the pixels of the region.

9. Non-transitory computer readable support with a memory storing code instructions for the implementation of the method according to claim 1, when instructions are executed by a computer reading said non-transitory computer readable support.

10. Image processing system, comprising a processing unit of the processing means suited to implementing the method according to claim 1.

11. Image processing system according to claim 10, further comprising an image acquisition means, said image acquisition means being a fingerprint sensor of thin film transistor type.

* * * * *